United States Patent
Kawano et al.

(10) Patent No.: US 7,753,981 B2
(45) Date of Patent: Jul. 13, 2010

(54) FILTER UNIT AND FILTER UNIT PANEL

(75) Inventors: Eizo Kawano, Osaka (JP); Takashi Tago, Osaka (JP); Youzou Yano, Osaka (JP); Akio Suzuki, Osaka (JP)

(73) Assignee: Nitto Denko Corporation, Osaka (JP)

( * ) Notice: Subject to any disclaimer, the term of this patent is extended or adjusted under 35 U.S.C. 154(b) by 256 days.

(21) Appl. No.: 11/975,324

(22) Filed: Oct. 18, 2007

(65) Prior Publication Data

US 2008/0105126 A1  May 8, 2008

(30) Foreign Application Priority Data

Oct. 19, 2006  (JP) ............................ 2006-285548

(51) Int. Cl.
*B01D 46/00* (2006.01)
(52) U.S. Cl. ............................ 55/497; 55/484; 55/511; 55/521; 55/DIG. 31; 210/493.1; 210/493.3
(58) Field of Classification Search ............. 55/483, 55/484, 497, 511, 521, DIG. 31; 210/493.1, 210/493.3, 493.5, 495
See application file for complete search history.

(56) References Cited

U.S. PATENT DOCUMENTS

| | | | | |
|---|---|---|---|---|
| 3,177,637 A | * | 4/1965 | Davis | 55/483 |
| 4,009,012 A | * | 2/1977 | Heffler | 55/483 |
| 4,233,044 A | * | 11/1980 | Allan | 55/355 |
| 4,639,261 A | * | 1/1987 | Pittman et al. | 55/502 |
| 5,797,975 A | * | 8/1998 | Davis | 55/493 |
| 5,879,423 A | | 3/1999 | Luka et al. | |
| 6,562,095 B1 | * | 5/2003 | Toreklsson et al. | 55/483 |
| 6,808,547 B2 | * | 10/2004 | Ota et al. | 55/478 |
| 7,320,720 B2 | * | 1/2008 | Ticknor | 55/483 |

(Continued)

FOREIGN PATENT DOCUMENTS

DE  195 08 534 A1  9/1996

(Continued)

OTHER PUBLICATIONS

Machine translation of JP 2005-177641, published Jul. 7, 2005.*

(Continued)

*Primary Examiner*—Michael A Marcheschi
*Assistant Examiner*—Robert A Clemente
(74) *Attorney, Agent, or Firm*—Hamre, Schumann, Mueller & Larson, P.C.

(57) ABSTRACT

The present invention provides filter units that, when joined together, allow joining portions thereof to be fixed together satisfactorily and can prevent air from leaking at the joining portions. A filter unit includes a filter medium that has been pleated and a frame that supports the circumference of the filter medium. The frame has a protruding part on at least one face selected from an upper face and a lower face thereof, with the protruding part being formed by allowing a part of the at least one face to protrude. The upper face is a surface of the frame that faces the upstream side relative to the flow of air that passes through the filter medium, and the lower face is a surface of the frame that faces the downstream side relative to the flow of air.

3 Claims, 4 Drawing Sheets

U.S. PATENT DOCUMENTS

2003/0177745 A1* 9/2003 Jauw .......................... 55/497
2004/0020177 A1 2/2004 Ota et al.
2005/0022490 A1* 2/2005 Huang et al. .................. 55/486

FOREIGN PATENT DOCUMENTS

EP  1 504 803 A1  2/2005
JP  2005-177641  7/2005

OTHER PUBLICATIONS

Machine translation of EP 1 504 803, published Feb. 9, 2005.*

* cited by examiner

FILTER UNIT AND FILTER UNIT PANEL

BACKGROUND OF THE INVENTION

1. Field of the Invention

The present invention relates to filter unit panels used mainly in inlets of, for example, clean rooms, air conditioning equipment, gas turbines, and steam turbines, and to filter units constituting the same.

2. Background of the Invention

An air filter is provided in each inlet of, for example, clean rooms, air conditioning equipment, gas turbines, and steam turbines. For this air filter, a filter unit panel is used that is formed as an air filter by joining a plurality of filter units together, each of which has a filter medium and a frame for supporting it, with their outer peripheral surfaces being in contact with each other.

JP 2005-177641 A discloses, as an example of the filter unit, "a filter unit comprising a filter medium including a polytetrafluoroethylene porous membrane and an air-permeable fibrous material, and a supporting frame containing resin, wherein the filter medium and the supporting frame are integrated together, with the peripheral part of the filter medium being buried in the supporting frame and the resin permeating the peripheral part". Furthermore, it also discloses a filter unit assembly in which a plurality of filter units, each of which is the above-mentioned filter unit provided with fitting portions, are joined together by a fitting method of, for example, a hook type or a slide type.

However, the use of the fitting method of, for example, a hook type or a slide type alone as described in JP 2005-177641 A may possibly allow the filter units to slide with respect to each other in a certain direction at the joining portions. Accordingly, the filter units may be movable with respect to each other at the joining portions and are not fixed together satisfactorily, which has been a problem. Furthermore, it is difficult to fit them to each other strictly without forming any gaps at the joining portions. Therefore air can leak through a gap formed at the joining portions although the amount thereof is not large. The air leakage through the joining portions allows particulate in the air also to leak and therefore is a problem particularly in the use of the filter unit assembly for clean rooms where a high degree of dust prevention is required.

SUMMARY OF THE INVENTION

Accordingly, the present invention is intended to provide filter units that allow joining portions thereof to be fixed together satisfactorily and can prevent air from leaking at the joining portions when they are joined together. The present invention also is intended to provide a filter unit panel in which joining portions are fixed together satisfactorily and air leakage at the joining portions is prevented.

The present invention provides a filter unit including a filter medium that has been pleated and a frame that supports circumference of the filter medium. The frame has a protruding part on at least one face selected from an upper face and a lower face thereof, with the protruding part being formed by allowing a part of the at least one face to protrude. The upper face is a surface of the frame that faces the upstream side relative to the flow of air that passes through the filter medium, and the lower face is a surface of the frame that faces the downstream side relative to the flow of air.

The present invention also provides a filter unit panel including a plurality of filter units, each of which has a filter medium that has been pleated and a frame that supports circumference of the filter medium. In the filter unit panel, the plurality of filter units are joined together, with outer peripheral surfaces of frames thereof being in contact with each other. The frame is welded to a frame adjacent thereto on at least one face selected from an upper face and a lower face thereof. The upper face is a surface of the frame that faces the upstream side relative to the flow of air that passes through the filter medium, and the lower face is a surface of the frame that faces the downstream side relative to the flow of air.

With the filter units of the present invention, when they are joined together to form a filter unit panel, welding the protruding parts to each other allows joining portions thereof to be fixed satisfactorily. Furthermore, the air leakage at the joining portions also can be prevented easily. Moreover, in the filter unit panel of the present invention, the joining portions are fixed to each other satisfactorily and the air leakage at the joining portions is prevented.

DESCRIPTION OF THE EMBODIMENTS

Figure 1:
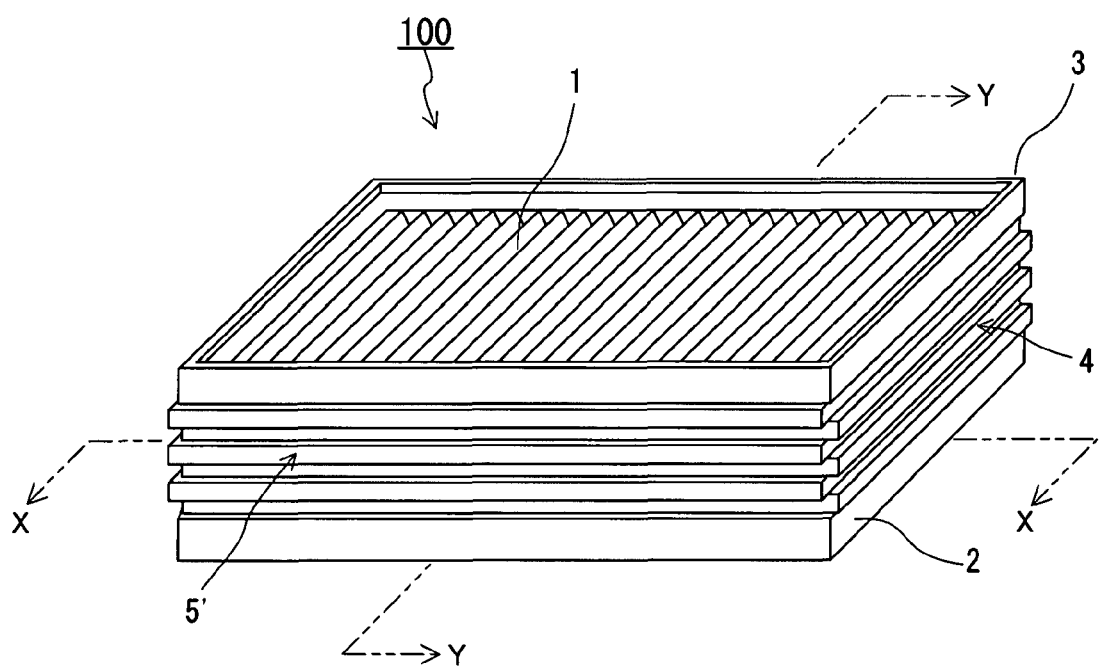
FIG. 1 is a perspective view of one embodiment of the filter unit according to the present invention.

The present invention provides a filter unit including a filter medium that has been pleated and a frame that supports circumference of the filter medium. The frame has a protruding part on at least one face selected from an upper face and a lower face, with the protruding part being formed by allowing a part of the at least one face to protrude. The upper face is a surface of the frame that faces the upstream side relative to the flow of air that passes through the filter medium, and the lower face is a surface of the frame that faces the downstream side relative to the flow of air.

The type of the filter medium to be used in the present invention is not particularly limited. Known filter media and those having dust prevention performance equal to or higher than that thereof can be used. Examples of the filter medium include a glass filter medium, an electret nonwoven fabric filter medium, and a polytetrafluoroethylene (PTFE) porous membrane filter medium. Among these media, it is preferable that the PTFE porous membrane filter medium be used because it is a clean material that does not generate dusts and has a high dust-collecting performance. Preferably, the PTFE porous membrane filter medium includes a PTFE porous membrane and an air-permeable fibrous material.

As the PTFE porous membrane, one employed in a known filter medium or one having filter properties equal to or higher than those thereof can be used. For example, it can be produced as follows or alternatively, a commercial item can be used.

First, a paste mixture containing a liquid lubricant added to PTFE fine powder is preformed. The liquid lubricant is not particularly limited as long as it can wet the surface of the PTFE fine powder and can be removed by extraction or heating. Examples thereof that can be used herein include hydrocarbons such as liquid paraffin, naphtha, and white oil. A suitable amount of the liquid lubricant to be added is approximately 5 to 50 parts by weight relative to 100 parts by weight of PTFE fine powder. The preforming is carried out at a pressure level that does not cause the liquid lubricant to be squeezed out.

Next, the preformed body is formed into a sheet by paste extrusion or rolling. This PTFE sheet body is then stretched at least in one axial direction. Thus a PTFE porous membrane is obtained. It is desirable that the PTFE sheet body be stretched after the liquid lubricant is removed. The stretch ratio is not particularly limited. It can be determined suitably according to pressure loss and filtering efficiency. When consideration is given to variations in stretching or rupture that is caused during stretching, the area stretch ratio (product of the stretch ratio in one axial direction and that in a direction perpendicular thereto) is preferably 50 to 900 times.

The PTFE porous membrane has preferably an average pore size of 0.01 to 5 µm, an average fiber diameter of 0.01 to 0.3 µm, and a pressure loss of 10 to 295 Pa, which is measured when air is passed through at a flow rate of 5.3 cm/sec.

The air-permeable fibrous material has a function as a reinforcement. Furthermore, the air-permeable fibrous material itself also has a dust collecting function and may serve as a prefilter. In this case, the PTFE porous membrane can be prevented from being clogged and the increase in pressure loss caused by clogging can be suppressed. Accordingly, the life of usage of the filter medium is prolonged. Based on the filtering theory, the performance of collecting dust improves with a decrease in fiber diameter of the air-permeable fibrous material. Accordingly, it is desirable that an air-permeable material with a smaller fiber diameter be provided for the face to be located upstream in use.

The air-permeable fibrous material is preferably one having higher strength and air permeability than those of the PTFE porous membrane. The material and form thereof are not particularly limited. Examples of the form thereof include felt, nonwoven fabric, woven fabric, mesh (mesh sheet), and other porous materials. From the viewpoints of strength, filtering properties, flexibility, and workability, nonwoven fabric is preferred. Examples of the material include polyolefin (e.g. polyethylene (PE) and polypropylene (PP), etc.), polyester (e.g. polyethylene terephthalate (PET), etc.), polyamide (aliphatic polyamide and aromatic polyamide), and composite materials thereof. When the air-permeable fibrous material has a form of nonwoven fabric, it is preferably a nonwoven fabric formed of a fiber with a core-sheath structure in which a high melting point material forms the core part and a low melting point material forms the sheath part.

The PTFE porous membrane usually has an average pore size of 0.01 to 5 µm and therefore appears to be white. Air-permeable fibrous materials of a general grade also are white but those that have been colored also can be used. The method of coloring them is not particularly limited. Examples thereof include a method in which a pigment is kneaded into their raw materials, a method in which they are dyed with a dye, and a method in which they are colored by printing. The color with which they are colored is not particularly limited and can be selected suitably according to the application thereof.

In the case where a pigment is kneaded into an air-permeable fibrous material, generally a raw material resin is brought into a molten state and the pigment then is kneaded thereinto. In the case where a pigment is mixed into a PTFE porous membrane, it is advantageous that a pigment and a liquid lubricant may be added to PTFE fine powder and thereby a paste mixture is obtained. Furthermore, in order to impart other properties such as electrical conductivity, it also is possible to mix a plurality of materials into the air-permeable fibrous material. In the case of dyeing with a dye, the PTFE porous membrane and the air-permeable fibrous material each may be immersed in a dye, or a filter medium in which the PTFE porous membrane and the air-permeable fibrous material are laminated together may be immersed in a dye. In the case of printing, generally, for example, gravure printing is employed. Moreover, for example, an antibacterial agent or a water repellant can be added in coloring the air-permeable fibrous material.

The aforementioned PTFE porous membrane and air-permeable fibrous material are laminated together, so that a PTFE porous membrane filter medium can be produced. The lamination method is not particularly limited. They simply may be overlapped or may be laminated by, for example, adhesive lamination or thermal lamination. For instance, in the case where they are laminated by the thermal lamination, a part of the air-permeable fibrous material such as nonwoven cloth is melted by heating and they then can be bonded to each other so as to be laminated. Moreover, they also can be bonded to each other so as to be laminated, with a fusing agent such as a hot-melt adhesive being interposed therebetween.

One each or two each or more of the PTFE porous membrane and air-permeable fibrous material can be used for lamination. When two each or more of them are used, they may be of the same type or different types.

The filter medium used in the present invention is one that has been pleated to increase the ventilation area and collecting area. That is, the filter medium has a pleated form with a mountain fold and a valley fold being repeated alternately. For example, the height of the mountain of a pleat and the pleating angle can be the same as those of known filter media having a pleated form.

The thickness of the filter medium is not particularly limited. However, since the thickness should maintain the shape of the filter medium after pleating, the thickness is preferably 0.05 to 1 mm. The pressure loss of the filter medium is preferably 20 to 300 Pa and more preferably 50 to 200 Pa when air is allowed to permeate at a linear velocity of 5.3 cm/sec. Furthermore, the efficiency of collecting particles with a particle diameter of 0.3 to 0.5 µm at a linear velocity of 5.3 cm/sec is preferably at least 99% and more preferably at least 99.97%. Further preferably, the efficiency of collecting particles with a particle diameter of 0.1 to 0.2 µm at a linear velocity of 5.3 cm/sec is at least 99.9995%.

The frame is joined to the end portions in the circumference of the filter medium, and thereby surrounds and supports the filter medium. The material to be used for the frame is a material that allows at least the protruding part described later to be welded, and usually is resin. Examples of the resin to be used for the frame include polyolefin resin, polyamide resin, polyurethane resin, polyester resin, polystyrene resin (e.g. acrylonitrile-butadiene-styrene (ABS) resin, etc.), and polycarbonate resin. These resins may be used individually or two or more of them may be used in combination. The shrinkage factor of the resin to be used for the frame is preferably $20/1000$ or lower, more preferably $10/1000$ or lower, and further preferably $5/1000$ or lower.

The frame may contain other materials for improving properties of these resins or adding new properties. For instance, the frame may contain filler, such as a glass fiber or a carbon fiber, for improving strength, a pigment for coloration, and an antibacterial agent for imparting antibacterial properties.

The filter unit of the present invention is characterized most in that the frame has a protruding part on at least one face selected from an upper face and a lower face, with the protruding part being formed by allowing a part of the at least one face to protrude, where the upper face is a surface of the frame that faces the upstream side relative to the flow of air that passes through the filter medium, and the lower face is a surface of the frame that faces the downstream side relative to the flow of air. When two filter units of the present invention are disposed side by side, the respective protruding parts of the filter units protrude in the direction of depth of the filter units while being very close to each other or preferably in contact with each other. When the protruding parts are welded to each other, the seam of the joining portions is closed to be sealed and thereby air is prevented from leaking and the filter units are fixed to each other satisfactorily.

Preferably, the protruding part is provided for both the upper face and the lower face of the frame to ensure fixation and sealing of the joining portions. When two filter units of the present invention are disposed side by side, the ease of welding increases with a decrease in distance between the protruding parts. Accordingly, it is preferable that each protruding part be formed nearer to the outer periphery than to the inner periphery of the frame and it is more preferable that it have a surface extending from the outer peripheral surface of the frame. Furthermore, welding all the joining portions when the filter units are joined together is preferred for fixing the joining portions to each other and preventing a leak. Accordingly, it is preferable that the protruding part be provided to surround the filter medium when viewed from the direction perpendicular to the frame surface having the protruding part. The size of the protruding part is not particularly limited as long as it ensures a sufficient amount of resin for welding to be provided.

Preferably, in the filter unit of the present invention, fitting portions with a concave shape and/or a convex shape are formed at four side faces that form the outer periphery of the frame, and two side faces opposing each other have shapes that allow a fitting portion of one of the side faces to fit to that of the other of the side faces. When the concave-convex shapes of the fitting portions are formed in this manner, filter units can be joined together easily. Moreover, strength and endurance with respect to air pressure imposed continuously on the upper face of the frame and the filter medium in the direction perpendicular thereto are improved.

In this case, it is preferable that the cross-sectional shape of the fitting portion of one side face of the outer periphery of the frame is identical to that of the fitting portion of one selected from two side faces adjacent to the one side face. When the concave-convex shapes of the fitting portions are designed in this manner, a plurality of filter units can be joined and fixed together successively by being arranged with their orientations being matched. This improves design flexibility in shape and area of a filter unit panel.

The size of the filter unit can be determined suitably according to the size of the filter unit panel. For instance, the common size of current filter unit panels is 610×610 mm. Accordingly, for example, each filter unit can have a size of 305×305 mm so that the total size of four filter units joined together is 610×610 mm. The thickness (depth) of the filter unit also is not particularly limited but is preferably 200 mm or less from the viewpoint of space saving.

The filter unit of the present invention is described in detail using an embodiment as an example with reference to the drawings.

FIG. 1 is a perspective view of an embodiment (filter unit 100) of the filter unit according to the present invention. In the filter unit 100, a filter medium 1 is joined with a frame 2 by the four peripheral sides thereof and thereby is supported by the frame 2. The upper face of the frame has a protruding part (welding rib) 3 formed by allowing a part of the upper face to protrude. In this embodiment, the welding rib 3 also is provided for the lower face of the frame. The outer peripheral surfaces of the frame 2 are provided with fitting portions 4 and 5'. Furthermore, although it is not shown in FIG. 1, fitting portion 4' is provided for the opposite surface to the outer peripheral surface provided with the fitting portion 4 and fitting portion 5 is provided for the opposite surface to the outer peripheral surface provided with the fitting portion 5'. In order to describe the welding rib 3 and these fitting portions further in detail, the cross-sections of the filter unit 100 are shown in FIGS. 2 and 3.

Figure 2:
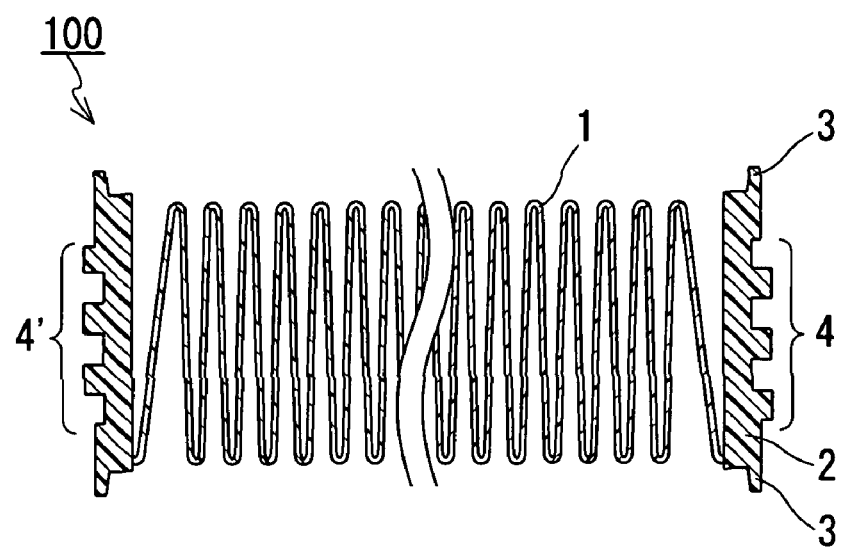
FIG. 2 is a sectional view of the filter unit of FIG. 1 taken along the line X-X.

FIG. 2 is a sectional view along the line X-X, i.e. a sectional view cut along the direction of the flow of air that passes through the filter medium, in the direction perpendicular to the fold of pleats of the filter medium. The upper face and lower face of the frame are provided with welding ribs 3. In this embodiment, the welding ribs 3 are provided for portions nearest to the outer peripheries of the upper face and lower face of the frame 2 and have a surface extending from the outer peripheral surface of the frame 2. Moreover, the outer peripheral surfaces of the frame 2 are provided with the fitting portions 4 and 4'. The fitting portions 4 and 4' are provided, with convex parts and concave parts being equally opposed to each other, and have shapes that allow them to fit to each other.

Figure 3:
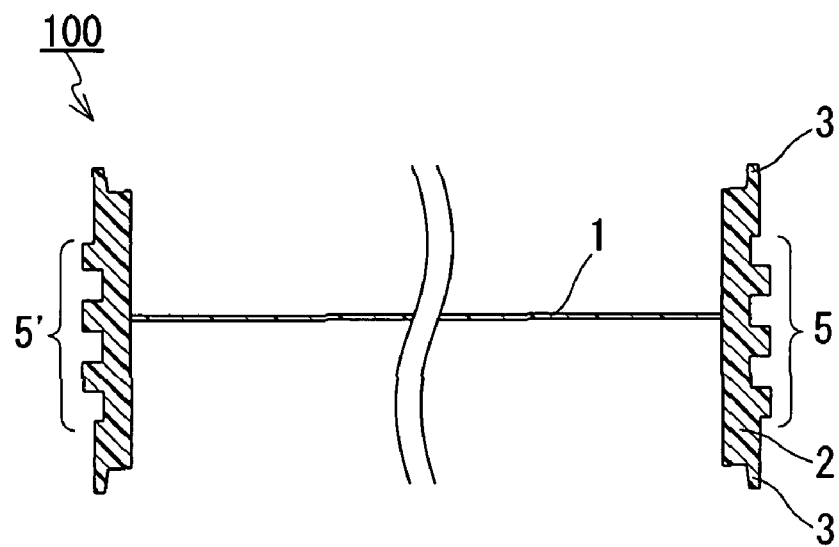
FIG. 3 is a sectional view of the filter unit of FIG. 1 taken along the line Y-Y.

FIG. 3 is a sectional view along the line Y-Y, i.e. a sectional view cut along the direction of the flow of air that passes through the filter medium, in the direction parallel to the fold of pleats of the filter medium. Welding ribs 3 are provided for the portions nearest to the outer peripheries of the upper face and lower face of the frame 2. In this embodiment, the welding ribs 3 of the upper face and lower face of the frame 2 each are provided so as to surround the filter medium 1 when viewed from the direction perpendicular to the upper face and lower face. The outer peripheral surfaces of the frame 2 are provided with fitting portions 5 and 5' that fit to each other. The sectional shape of the fitting portion 5 is identical to that of the fitting portion 4 shown in FIG. 2, and the sectional shape of the fitting portion 5' is identical to that of the fitting portion 4' shown in FIG. 2. Accordingly, the sectional shape of the fitting portion of one side face of the periphery of the frame 2 is identical to that of the fitting portion of one of two side faces adjacent to the one side face.

Figure 4:
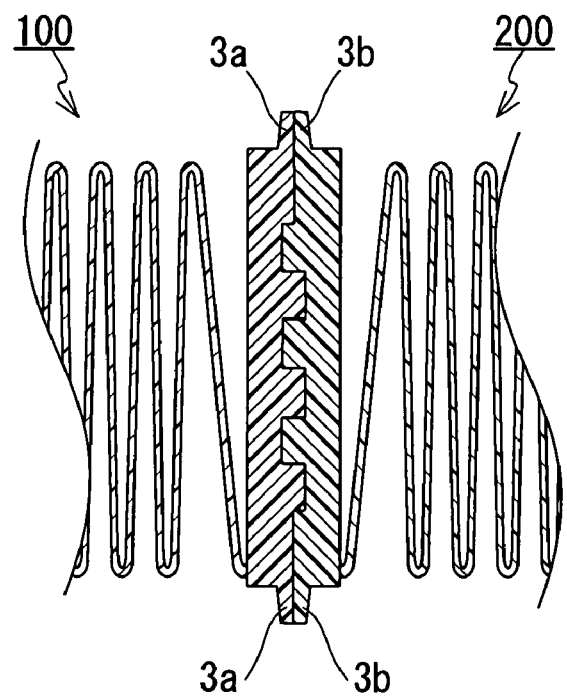
FIG. 4 is a sectional view of one embodiment of the filter unit according to the present invention, with outer peripheral surfaces of two filter units being fitted to each other.
Figure 5:
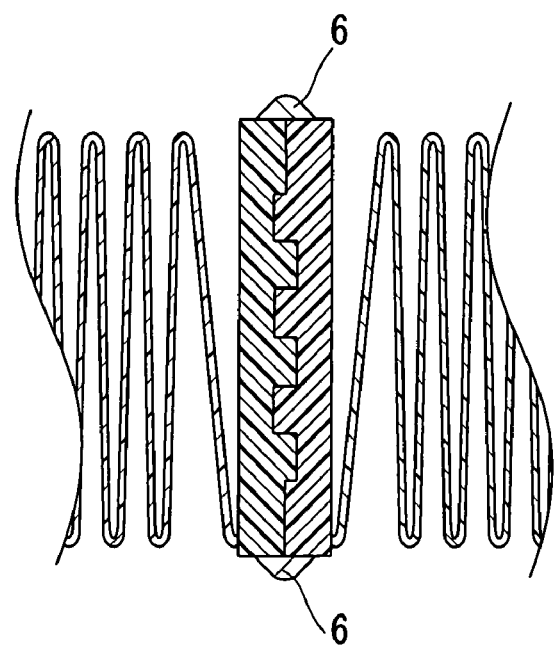
FIG. 5 is a sectional view of one embodiment of the filter unit according to the present invention, with two filter units being welded to each other.

FIG. 4 is a sectional view of the filter unit 100 and a filter unit 200 whose configuration is identical to that of the filter unit 100, which are fitted to each other. The filter unit 100 and the filter unit 200 are fitted to each other by their fitting portions. The welding rib 3a of the filter unit 100 and the welding rib 3b of the filter unit 200 protrude in contact with each other. The state obtained after the welding ribs 3a and 3b are welded to each other is shown in FIG. 5. A welded part 6, which is obtained by softening and then hardening the welding ribs 3a and 3b so as to integrate them, fixes the filter units to each other and seals the joining portions.

The concave-convex shapes of the fitting portions of the frame are not limited to those shown in FIGS. 1 to 5. One fitting portion may have only a convex shape and the other may have only a concave shape.

The filter unit of the present invention can be produced by bonding a frame having the protruding parts and, if necessary, fitting portions as described above to a filter medium. However, in order to joining the filter medium and the frame without forming gaps therebetween, it is preferable that the filter unit be produced by molding the filter medium and the frame integrally by insert molding. The insert molding can be carried out by loading a filter medium into a mold having a flow channel for resin corresponding to the frame shape described above and then injecting resin (containing, for example, a filler if necessary) for the frame thereinto. Specific conditions for the insert molding can be set according to known conditions.

A filter unit panel of the present invention can be obtained by disposing a plurality of filter units described above, with the outer peripheral surfaces of the frames being in contact with each other, and joining them together by welding the protruding parts to each other.

Specifically, the filter unit panel has a plurality of filter units, each of which has a filter medium that has been pleated and a frame that supports circumference of the filter medium. The plurality of filter units are joined together, with outer peripheral surfaces of the frames thereof being in contact with each other. The frame is welded to a frame adjacent thereto on at least one face selected from an upper face and a lower face. The upper face is a surface of the frame that faces the upstream side relative to the flow of air that passes through the filter medium, and the lower face is a surface of the frame that faces the downstream side relative to the flow of air.

Figure 6:
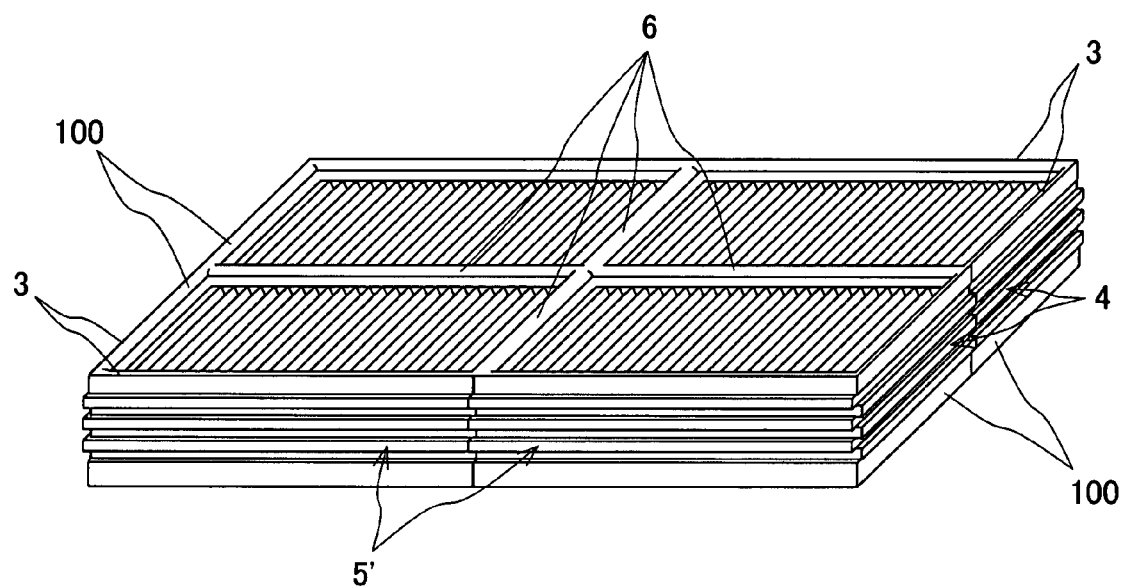
FIG. 6 is a perspective view of one embodiment of the filter unit panel according to the present invention including four filter units that are joined together.

FIG. 6 shows an embodiment of the filter unit panel of the present invention. FIG. 6 is a drawing that shows a filter unit panel in which four pieces of the filter unit 100 shown in FIG. 1 are joined together. The side faces of each filter unit 100 are provided with fitting portions 4, 4', 5, and 5'. With the fitting portion 4 and the fitting portion 4' as well as the fitting portion 5 and the fitting portion 5' being fitted to each other, a filter unit 100 is joined to a filter unit 100 adjacent thereto while the outer peripheral surfaces of their frames are in contact with each other. Welding ribs 3 are welded to each other at the joining portions to form welded parts 6. The welding ribs 3 remain at the outer periphery of the filter unit panel. The welded parts 6 are formed at all the joining portions. These welded parts 6 allow the joining portions to be sealed and thereby prevent air from leaking through the joining portions. Furthermore, the filter units are fixed satisfactorily through the welded parts 6.

The protruding parts of filter units to be joined together are welded to each other by melting the two protruding parts together and then allowing them to solidify. The protruding parts are melted by being heated to at least the melting point of the resin used for the protruding parts. Examples of the heating method include heating with frictional heat obtained through ultrasonic irradiation, heating with a heat source such as a heater, and heating with a laser.

The size of the filter unit panel is not particularly limited. It can be determined suitably according to the size of the space where the filter unit panel is to be installed. The common size of current filter unit panels is 610×610 mm. Accordingly, for example, four filter units, each of which has a size of 305×305 mm, may be used so that the total size of four filter units joined together is 610×610 mm. The depth of the filter unit panel also is not particularly limited but is preferably 200 mm or less from the viewpoint of space saving.

The pressure loss of the filter unit panel is not particularly limited but is preferably 300 Pa or lower at an air flow rate of 10 m$^3$/min from the viewpoint of energy efficiency. In this regard, a filter medium with a suitable pressure loss can be selected according to the filter design and then the area of the filter medium can be determined. Furthermore, the filtering efficiency of the filter unit panel also can be determined suitably by selecting a filter medium with a suitable filtering efficiency according to the filter design. The filtering efficiency is preferably at least 99% and more preferably at least 99.97% when particles with a particle diameter of 0.3 to 0.5 μm permeate the filter medium at a linear velocity of 1.2 cm/min. Further preferably, the filtering efficiency is at least 99.9995% when particles with a particle diameter of 0.1 to 0.2 μm permeate the filter medium at a linear velocity of 1.2 cm/min.

The performance of the filter unit panel of the present invention does not degrade even when it is washed with water. Accordingly, it can be cleaned with, for example, ultrasonic wave.

In the filter unit panel of the present invention with the configuration as described above, the joining portions are fixed together satisfactorily and thereby the air leakage is prevented from occurring at the joining portions. Accordingly, the filter unit panel of the present invention is suitable for air filters used in inlets of, for example, clean rooms, air conditioning equipments, gas turbines, and steam turbines.

EXAMPLE

Next, the present invention is described further in detail using an example but is not limited thereto.

Example 1

A PTFE porous membrane with an area stretch ratio of 600 times was placed between two sheets of PET/PE core-sheath nonwoven fabric (with a weight per unit area of 30 g/m$^2$) so as to be overlapped. Thereafter, it was passed through a pair of rolls heated to 180° C. and thereby thermal lamination was carried out. Thus a filter medium (with a thickness of 0.26 mm, a pressure loss of 45 Pa, and a filtering efficiency of 99.3%) was obtained that is a three layer product composed of the PTFE porous membrane and air-permeable fibrous materials.

The filter medium thus obtained was pleated to have a mountain height of 27 mm and then was cut into a size that allows 95 pleated mountains to be included. On the other hand, a mold was prepared, which was able to accommodate a filter medium and had a flow channel for resin for forming a frame having sectional shapes of the same design as that shown in FIGS. 2 and 3 and an external size of 195 mm height×295 mm width×30 mm depth. The filter medium was set in the mold and ABS resin was injected thereinto with an injection molding machine. Thus, a filter unit was obtained that had an external size of 195 mm×295 mm×30 mm and a frame having a protruding part (welding rib) and fitting portions with concave-convex shapes shown in FIGS. 2 and 3. Six pieces of this filter unit were produced.

With these six filter units, fitting portions provided for the outer peripheral surfaces of their frames were fitted to each other so that they were arranged in the form of a 2 (in vertical direction)×3 (in horizontal direction) matrix. In this stage, the filter units were slidable with respect to each other. Subsequently, the welding ribs were subjected to ultrasonic waves and they were melted by frictional heat generated thereby to be welded to each other. Thus, a filter unit panel was produced. The welding was carried out for both surfaces of the panel. This welding allowed the respective filter units to be fixed together completely and they were no longer movable with respect to one another. There were no seams at the joining portions and there were no gaps through which air could pass.

The filter unit panel composed of filter units of the present invention is suitable for air filters used in inlets of, for example, clean rooms, air conditioning equipments, gas turbines, and steam turbines.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A filter unit comprising:

a filter medium that has been pleated, and a frame that supports circumference of the filter medium, wherein the frame has a protruding part on at least one face selected from an upper face and a lower face thereof, with the protruding part being formed by allowing a part of the at least one face to protrude, the upper face is a surface of the frame that faces an upstream side relative to a flow of air that passes through the filter medium, the lower face being a surface of the frame that faces a downstream side relative to the flow of air, fitting portions with a concave shape and/or a convex shape being formed at four side faces that form an outer periphery of the frame, two side faces opposing each other having shapes that allow a fitting portion of one of the side faces to fit to that of the other of the side faces, fitting portions of the two side faces opposing each other being provided with a convex shape that matches a concave shape of the opposed side face and a concave shape that matches a convex shape of the opposed side face, a cross-sectional shape of a fitting portion of one side face of the outer periphery of the frame being identical to that of a fitting portion of one selected from two side faces adjacent to the one side face, and the protruding part being provided to surround the filter medium when viewed from a direction perpendicular to the surface of the frame having the protruding part, wherein the protruding part is formed in a position nearer to the outer periphery than to an inner periphery of the frame.

2. The filter unit according to claim 1, wherein the protruding part has a surface extending from the peripheral surface of the frame, 3. The filter unit according to claim 1, wherein the filter medium includes a polytetrafluoroethylene porous membrane and an air-permeable fibrous material.

* * * * *